United States Patent [19]
Wermeister

[11] Patent Number: 5,967,705
[45] Date of Patent: Oct. 19, 1999

[54] CUTTING TOOL HAVING A CUTTING CARTRIDGE ADJUSTED BY A TURNING KEY ENGAGEABLE WITH A SERRATION OF THE CARTRIDGE

[75] Inventor: Günter Wermeister, Meerbusch, Germany

[73] Assignee: Sandvik Aktiebolag, Sandviken, Sweden

[21] Appl. No.: 09/058,854

[22] Filed: Apr. 13, 1998

[30] Foreign Application Priority Data

Apr. 11, 1997 [SE] Sweden .................................. 9701332

[51] Int. Cl.⁶ ....................................................... B23C 5/24
[52] U.S. Cl. .................................. 407/39; 407/36; 407/38; 407/45
[58] Field of Search ................................... 407/35, 36, 37, 407/38, 39, 43, 44, 45, 49, 53; 408/153, 190, 191, 713

[56] References Cited

U.S. PATENT DOCUMENTS

| | | | |
|---|---|---|---|
| 4,133,399 | 1/1979 | Herrmann | 408/713 |
| 4,592,399 | 6/1986 | Rhodes | 407/38 |
| 4,848,977 | 7/1989 | Kieninger | 407/39 |
| 5,102,268 | 4/1992 | Mitchell | 407/36 |
| 5,336,026 | 8/1994 | Noggle | 407/39 |
| 5,353,668 | 10/1994 | Dahllöf . | |
| 5,667,343 | 9/1997 | Hessman et al. | 407/38 |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A rotary metal-cutting tool includes a tool body and a cartridge carrying a cutting insert that is adjustable in relation to the tool body. The adjustment is accomplished by providing a serration on one side surface of the cartridge and a correspondingly curved recess in the tool body adjacent the serration for the receipt of a key element. The key element has teeth engageable with the serration such that rotation of the key produces adjustment of the cartridge and insert.

11 Claims, 4 Drawing Sheets

CUTTING TOOL HAVING A CUTTING CARTRIDGE ADJUSTED BY A TURNING KEY ENGAGEABLE WITH A SERRATION OF THE CARTRIDGE

BACKGROUND OF THE INVENTION

The present invention relates to a cutting tool comprising a rotatable tool body having a recess therein and a cartridge carrying a cutting insert, received in said recess, said cartridge being releasably secured to said tool body. The invention provides means to enable displacement of said cartridge in relation to said tool body.

Rotary milling cutters with adjustment means are known, such as an eccentric element or a set screw to permit adjustment of the position of the insert prior to having such insert locked in its final position. Such means for permitting adjustment often suffer from disadvantages in that an eccentric element can yield at its pivoted mounting. Such adjustment element, however, can start to yield even when subject to axial loads. This can lead to difficulties where great accuracy of finish is required.

Further, milling cutters with adjustment wedge members are known. The usage of such wedge members, however, if used for axial adjustment, requires additional space in the axial direction.

It is therefore a demand for rotary cutters with improved adjustment means which require a minimum of space while not being susceptible to axial and radial loads.

The present invention aims to provide a solution to the above related problems.

SUMMARY OF THE INVENTION

The present invention relates to a cutting tool for chip machining of metal workpieces. The cutting tool comprises a tool body with a longitudinal axis of rotation. The body has a number of circumferentially spaced recesses that extend axially in the tool body. A plurality of cartridges are provided, each of which carries an insert. The cartridges are releasably secured in respective ones of the recesses by clamps. Each recess is defined by guide wall surfaces extending longitudinally in the tool body. A side surface of each cartridge is provided with a serration, and the tool body has a correspondingly curved recess arranged adjacent the serration for the receipt of a key element. A forward end portion of the key element has a circumferential surface possessing teeth which are engageable with the serration of the cartridge so that rotary movement of the key element after insertion into the recess and engagement with the serration, causes displacement of, and corresponding adjustment of, the cartridge in relation to the tool body. A lock is provided for locking the cartridge in position after adjustment.

BRIEF DESCRIPTION OF THE DRAWING

The invention will now be described in more detail with reference to the attached drawings.

DETAILED DESCRIPTION OF PREFERRED EMBODIMENTS OF THE INVENTION

Figure 1:
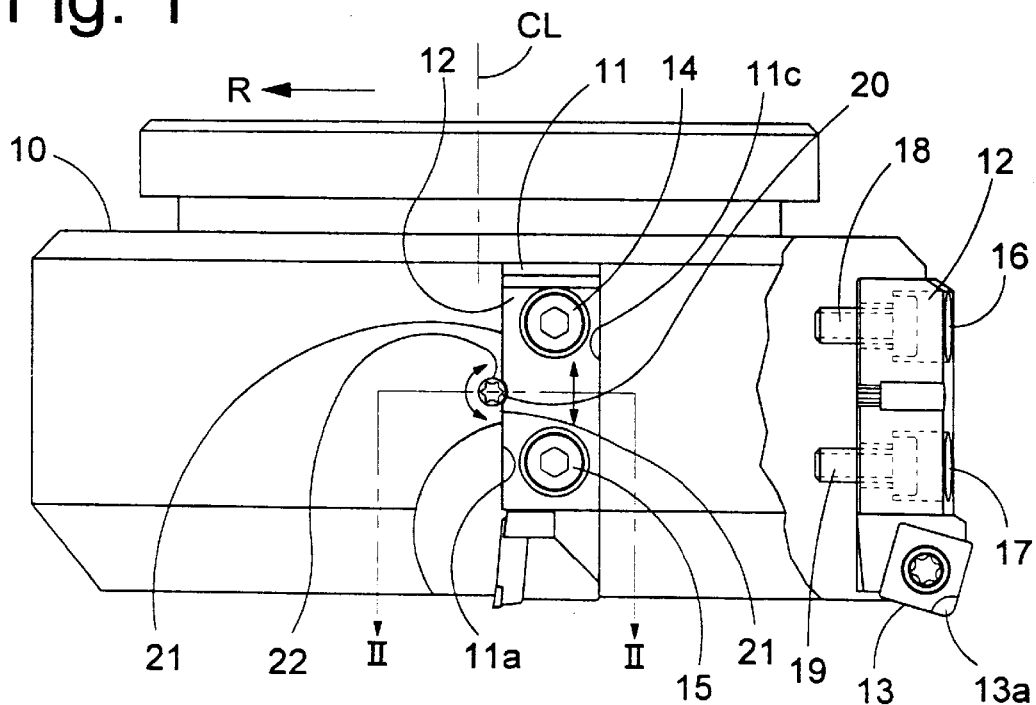
FIG. 1 shows a side view of a milling cutter and assembled cartridges provided with means for axial adjustment of said cartridges.
Figure 2:
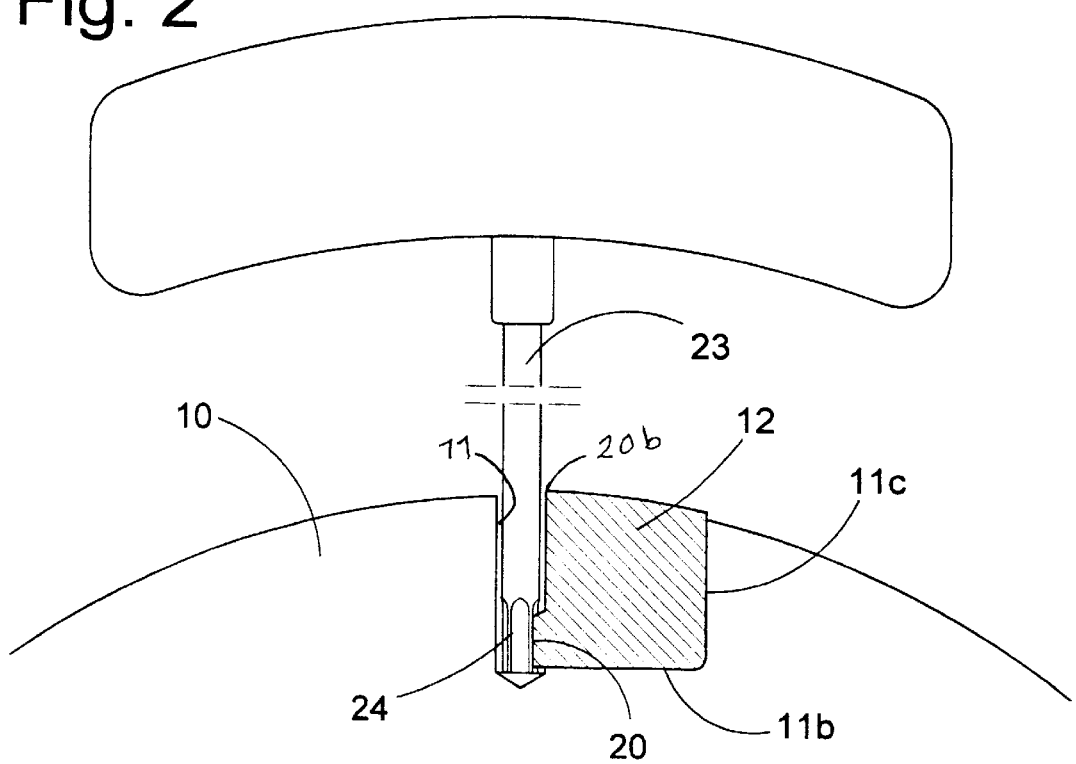
FIG. 2 is a partial sectional view taken along the line II—II in FIG. 1.
Figure 3:
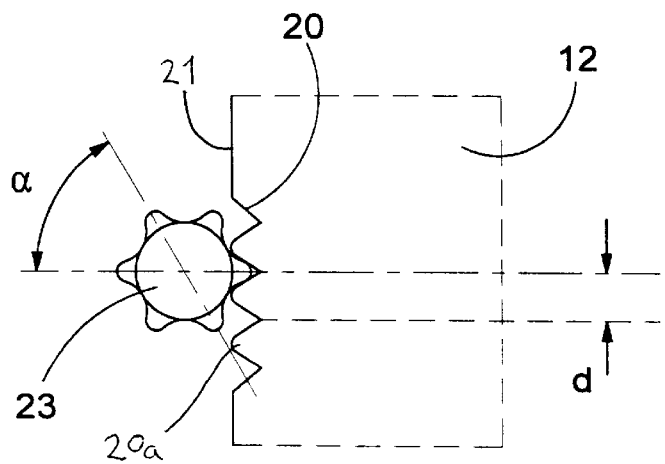
FIG. 3 is an enlarged view of an engagement between an adjustment key and the cartridge.

FIGS. 1–3 show a rotary tool body 10 having around its periphery a multiplicity of generally axially extending recesses 11 for the receipt of cartridges 12 each equipped with a cutting insert 13 made entirely of the same wear resistant material, usually cemented carbide material or ceramics. Alternatively each cutting insert could be a body with one or several tips 13a made of diamond or cubic boron nitride and forming a cutting edge. The tool body 10 is arranged to rotate around its central axis CL in the direction R. The recesses 11 are evenly distributed around the periphery of the tool body 10. Each recess 11 is U-shaped and confined by guide wall surfaces 11a, 11b and 11c which are parallel to the axis CL and are substantially perpendicular to each other and which function to positively fix the respective cartridge 12 against movement in respective directions. Each cartridge is seated against its guide walls and held thereagainst by two spaced locking bolts 14 and 15, said bolts being partially threaded and passing through corresponding elongated holes 16 and 17 formed in said cartridge so as to be threadably engaged in threaded bores 18, 19 in the tool body 10. The elongation of the holes permits the cartridge to be displaced after the locking bolts 14, 15 have been loosened.

At an intermediate portion of the cartridge between the position of said bolts 14, 15 there is provided a serration 20 (see FIG. 3) that is formed by teeth 20a which are spaced apart in an axial direction CL, with each tooth being elongate in a radial direction with reference to the axis CL. The serration 20 is formed on a radially inner portion of one side wall 21 of said cartridge, more specifically on a portion of that side wall which comes into surface-to-surface contact with the guide wall 11a of the recess 11. It is important to provide a recessed area 20b (FIG. 2) to give clearance for the cylindrical portion of a key element 23 (e.g., a TORX key), the forward end portion of which has teeth defining a gear-shaped surface for engagement with said serration 20. In other words, the cylindrical portion of said key element always has a somewhat larger diameter than the diameter of the circle which touches the outer peaks of said gear-shaped profile at the forward end of same key element. The teeth 20a of the serration 20 extend in the radial direction and perpendicular to a longitudinal extension of said cartridge. One example of the shape of the serration 20 is shown more clearly in FIG. 3. Adjacent the location of said serration 20 there is provided a circular recess 22 in the tool body 10 such that said recess intersects with the guide wall 11a. The axial position of said recess 22 should be about the same as the axial position of said serration 20 provided on the cartridge. The purpose of the location of said serration and said recess is to enable receipt therein of said key element 23 having an end portion 24 with its periphery having a surface design that corresponds with the shape of the teeth 20a of said serration 20.

After the locking bolts 14, 15 have been loosened, and the turning key has been placed into engagement with the serration 20, rotation of the turning key produces displacement of the cartridge. Then, the bolts 14, 15 are tightened.

Figure 4:
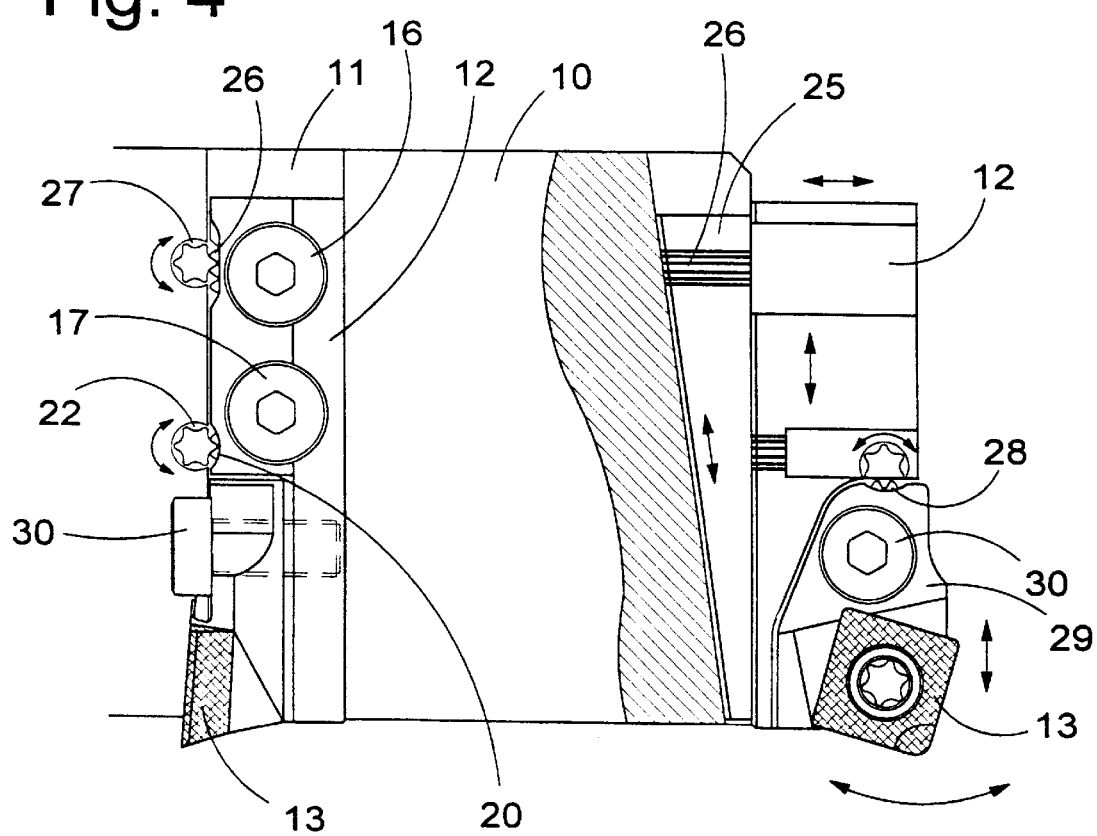
FIG. 4 is a side view of another embodiment of a milling cutter and assembled cartridges having means for both axial and radial adjustment of said cartridges.

FIG. 4 shows another embodiment of the invention, more specifically a face milling cutter equipped with cartridges 12 and associated wedge elements 25. More specifically, each wedge element 25 is provided as a radial spacer element between the cartridge 12 and the tool body 10. The cartridge 12 is provided with a first serration 20 whose teeth extend radially in the tool body 10 and there is an adjacent matching recess 22 in tool body 10 similar to the embodiment in FIG. 1, but additionally there is also provided a second serration 26 provided in one side surface of the wedge element 25. Adjacent said serration 26 there is a circular recess 27 in the tool body so that insertion and engagement of the key element 23 will cause longitudinal displacement, upwards or downwards, of the wedge when turning said key. This will enable radial adjustment of the cartridge and thus of the position of the cutting insert 13. Additional adjustment means shaped as a serration 28 are provided in an insert-carrying element 29 which is secured in a seat of said cartridge 12 by means of a bolt 30 that extends through said element 29 while being threadably engaged with said cartridge. By inserting a key element with a gear-shaped circumferential surface matching said serrations 28 into a recess on said element 29 it will be possible to attain a minor adjustment of the insert 13. This will enable a customer not only to set the cutting edge in axial and radial directions but also reach adjustment of the secondary cutting edge of the insert in relation to the angle that is needed around a given center line.

Figure 5:
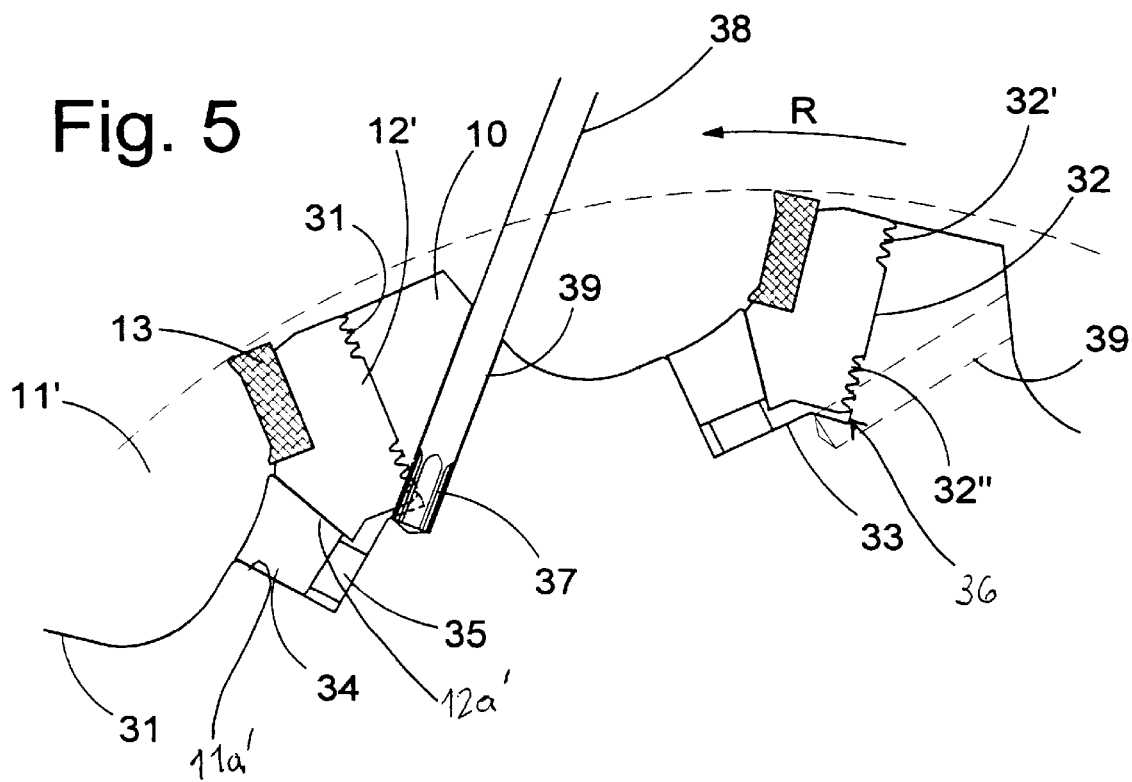
FIG. 5 shows a side view of a disc-shaped milling cutter according to the invention.
Figure 6:
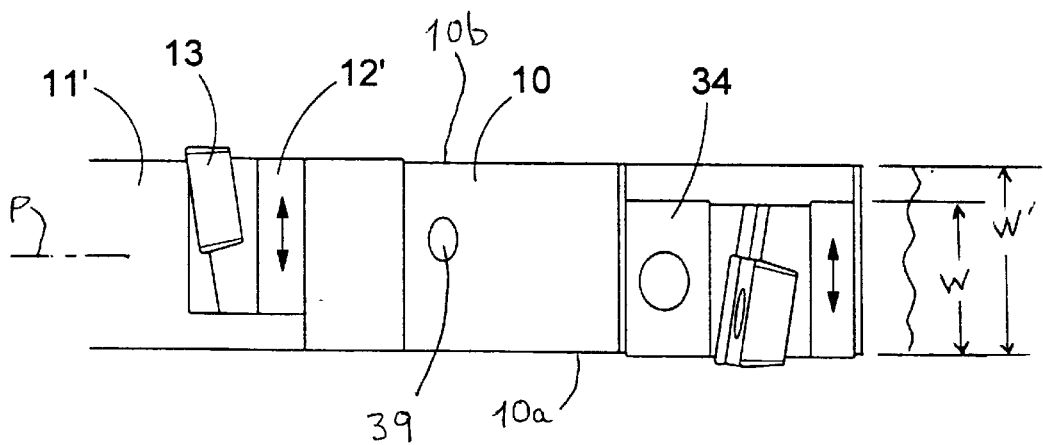
FIG. 6 shows an end view of the milling cutter in FIG. 5.
Figure 7:
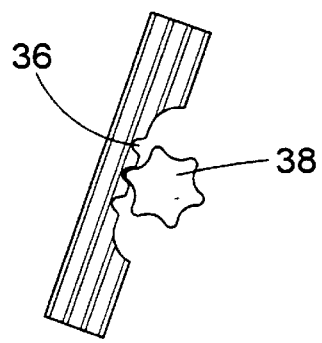
FIG. 7 shows an enlarged view of engagement surfaces of a key element and a cartridge as in FIG. 5.

In FIGS. 5–7 there is shown an alternative rotary cutter, in the form of a slotting cutter. The tool comprises a disc-shaped tool body 10 which is arranged for rotation around its central axis in direction R and is provided with a number of spaced recess 11' around its periphery, each said recess being confined by a forward wall 31, a rear wall 32 and a bottom wall 33. A partially wedge-shaped cartridge 12' is located in each said recess 11'. The width W of each cartridge 12' is less than the width W' of the disc-shaped tool body (see FIG. 6). Each cartridge is carrying an insert 13 of cemented carbide or similar wear resistant material. Every second insert extends slightly laterally beyond one side surface 10a of the tool body, and every insert therebetween extends laterally a similar distance beyond the opposite side surface 10b of the tool body 10. It will be appreciated that the inserts are of sufficient width to overlap the central plane P of tool body 10. The clamping means for the cartridge 12' is a clamping wedge 34 arranged radially inside the insert 13 on said cartridge 12' for guiding the axial movement of the cartridge 12' for guiding the axial movement of the cartridge 12'. The wedge is tightened towards the radially inner portion of the cartridge by a clamp screw 35 that extends through the wedge and is threadably engaged in a corresponding bore in the tool body. The rear wall 32 of said recess 11' is provided along a portion thereof with serrations 32' and 32" whose teeth extend parallel to the axis of rotation and are intended to engage with corresponding serrations in the rear wall of said cartridge 12'. The wedge 34 acts between a wall 11a' of the recess located remote from the partially serrated wall 32, and a radially inner portion 12a' of the cartridge.

Figure 8:
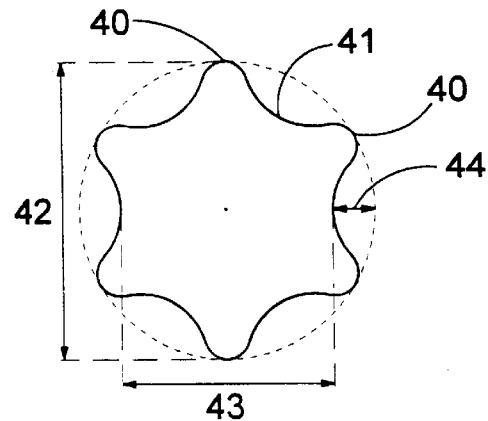
FIG. 8 shows an enlarged view of the profile of the key element in FIG. 7.

The cartridge 12' is provided at one of its radially innermost corners, more specifically the corner that is located adjacent the transition zone between the bottom wall 33 and rear wall 32, with a serrated surface 36 (see FIG. 7) having teeth intended to be engaged by the inner end portion 37 of a locking key element 38 that is received in a corresponding cylindrical bore 39 oriented at an inclined angle in relation to the direction of the rear wall 32 of said recess 11'. The rotation of said key element 38 will cause, after its engagement with serrated surface 36, axial displacement of said cartridge 12' thereby imparting axial adjustment of the insert 13 in relation to said tool body 10. This design, with an inclined bore 39 for receipt of the key element 38, makes it possible to maintain full support behind the cartridge, in contrast to the provision of a bore extending parallel to the serrated surface of the cartridge, that could weaken the stiffness and strength of the rear supporting wall behind said cartridge. As appears more clearly from FIG. 8, showing the end portion of said key element 38, that key element is defined in part by a first series of six spaced apart, semicylindrical surfaces 40. A second series of six semicylindrical surfaces 41 alternate with the surfaces 40 and merge smoothly and tangentially therewith to form radial teeth or lobes. The radius of curvature of the second series of surfaces 41 is considerably greater than, and preferably somewhat more than twice as great as, the radius of curvature of the surfaces 40. Further, as appears from FIG. 8, the maximum distance (major diameter) 42 across the surfaces of the first series is much greater than the minimum diameter 43 across the second surfaces 41. The distance 44 represents the depth of the flutes between the lobes formed by the surfaces 40, and this distance constitutes the difference between the maximum radial dimension 42 of the surfaces 40 and the minimum radial dimension 43 of the surfaces 41. This difference 44 is preferably 20–30% of the maximum radial dimension 42. More preferably, said distance 44 should be approximately 50% greater than the radius 40 of said first series of surfaces.

Although the configuration of the profile of the key element 23 or 38, discussed above, is described as a specifically preferred embodiment as shown more in detail in FIG. 8 it is to be understood that other profiles of the engagement end portion of said key element could be selected, as well as the profile of the matching profile of the side surface of said cartridge, 12, 12', within the scope of the invention.

Figure 9:
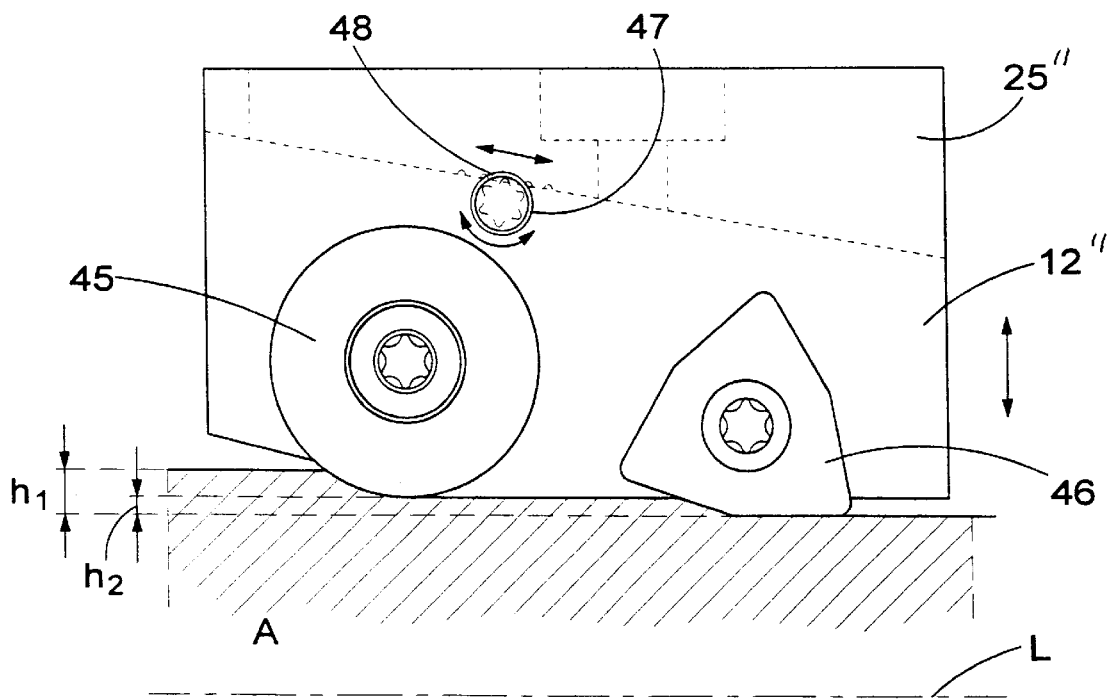
FIG. 9 shows a top view of another embodiment of a tool holder for a bar peeling tool equipped with a cartridge having means for adjustment of the insert carried by said cartridge.

In the embodiment shown in FIG. 9 there is a tool holder comprising a cartridge 12" and a wedge element 25" secured to a tool head that is intended to rotate about an axis L which coincides with the longitudinal axis of a cylindrical workplace A with which the tool is intended to engage. Such a rotary tool head is shown in Dahllöf U.S. Pat. No. 5,353,668, the subject matter of which is hereby incorporated by reference. A circularly shaped heavy duty insert 45 is provided on said cartridge at a certain distance axially in front of a finishing insert 46 of basically triangular design. The circular insert 45 will perform roughing operations to a certain cutting depth in the workpiece A whereas the finishing insert 46 creates the final surface in workpiece A at a cutting depth h2. The total cutting depth performed by inserts 45, 46 is indicated as h1. A radial adjustment of the position of said inserts is made possible by the provision of a circular recess 47 formed in the cartridge such that said recess intersects with one inclined side wall of said cartridge. Adjacent the location of said recess 47 is a serration 48 provided in the adjacent contact surface of the wedge element 25". The purpose of the location of said serration 48 and said recess 47 is to enable receipt therein of the same type of key element 23 having an end portion which on its periphery has a surface design that fully corresponds with the shape of said serration 48, i.e. with a surface design arrangement such as shown in FIG. 3. By turning such key element 23, while it is disposed in its recess 47 and engaged with said serration 48, radial adjustment of the cutting insert will occur as a result of the longitudinal displacement of said wedge element 25 when actuated by said key.

Although the present invention has been described in connection with preferred embodiments thereof, it will be appreciated by those skilled in the art that additions, deletions, modification, and substitutions not specifically described may be made without departing from the spirit and scope of the invention as defined in the appended claims.

I claim:

1. A cutting tool for chip machining of metal workpieces comprising a tool body with a longitudinal axis of rotation, said body having a number of circumferentially spaced, axially extending recesses, a plurality of cartridges each carrying an insert, the cartridges disposed in respective ones of said recesses, each recess defined by guide walls extending longitudinally in said tool body, a side surface of each cartridge being provided with a serration, and said tool body having a correspondingly curved recess arranged adjacent said serration for the receipt of a key element, a forward end portion of said key element having a circumferential surface possessing teeth engageable with the serration of said cartridge so that rotary movement of said key element after insertion into said curved recess and engagement with said serration causes displacement of and corresponding adjustment of said cartridge in relation to said tool body, and a lock for locking said cartridge in position after the adjustment, the key element being removable from said curved recess after the adjustment.

2. Cutting tool as claimed in claim 1, further including a wedge disposed between a base of each cartridge and its radially inner support surface in said recess, one side surface of said wedge having a serration, and said tool body having an adjacent recess for the receipt of a key element with matching teeth so that rotary movement of said key element causes longitudinal displacement of said wedge and a radial adjustment of said cartridge and its insert.

3. Cutting tool as claimed in claim 1 wherein said guide walls include a front wall, a rear wall and a bottom wall, said walls extending generally parallel to the axis of rotation the tool body, said bottom wall being oriented generally perpendicularly in relation to the front and rear walls.

4. Cutting tool as defined in claim 1 wherein the lock comprises two spaced threaded bolts that extend radially through elongated holes of said cartridge and into threaded engagement with said tool body, whereby teeth of the serration of said side surface of the cartridge extend in a common radial direction with the adjacent recess in said tool body.

5. A cutting tool for chip machining of metal workpieces comprising a tool body with a longitudinal axis of rotation, said body having a number of circumferentially spaced, axially extending recesses, a plurality of cartridges each carrying an insert, the cartridges disposed in respective ones of said recesses, each recess defined by guide walls extending longitudinally in said tool body, a side surface of each cartridge being provided with a serration, and said tool body having a bore arranged adjacent said serration for the receipt of a key element, a forward end portion of said key element having a circumferential surface possessing teeth engageable with the serration of said cartridge so that rotary movement of said key element after insertion into said bore and engagement with said serration causes displacement of and corresponding adjustment of said cartridge in relation to said tool body, wherein the tool body comprises a slotting cutter, wherein adjacent cutting inserts are arranged to project from opposite sides of the body, and a serration being provided on a radially inner corner region of each of the insert-carrying cartridges and the bore being arranged to terminate adjacent said serration such that the key element is engageable with said serration, said bore extending in a direction inclined from the direction in which a rear wall of said recess extends.

6. A cutting tool for chip machining of metal workpieces comprising a tool body with a longitudinal axis of rotation, said body having a number of circumferentially spaced, axially extending recesses, a plurality of cartridges each carrying an insert, the cartridges disposed in respective ones of said recesses, each recess defined by guide walls extending longitudinally in said tool body, a side surface of each cartridge being provided with a serration, and said tool body having a correspondingly curved recess arranged adjacent said serration for the receipt of a key element, a forward end portion of said key element having a circumferential surface possessing teeth engageable with the serration of said cartridge so that rotary movement of said key element after insertion into said curved recess and engagement with said serration causes displacement of and corresponding adjustment of said cartridge in relation to said tool body, and a lock for locking said cartridge in position after the adjustment, wherein each cartridge has a seat in which there is provided an insert carrying element which is releasably secured by a bolt extending through said element and threadably engageable with said cartridge, a further serration being provided in a peripheral surface portion of said element so that insertion and rotation of a toothed key element therein produces a minor adjustment of said insert carrying element.

7. Cutting tool as defined in claim 1 wherein a circumferential surface of the end portion of the key element comprises a first series of an even number, of spaced apart semicylindrical surfaces and a second series of semicylindrical surfaces that alternate with said surfaces of said first series and merging smoothly and tangentially therewith to form radial teeth, and that a portion of a side surface of each said cartridge is provided with a serration engageable by the teeth.

8. Cutting tool as defined in claim 7, wherein a radius of curvature of said second series of surfaces is more than twice as great as that of said first series of surfaces.

9. Cutting tool as defined in claim 8 wherein a difference between a maximum radial dimension of said first series of surfaces and a minimum radial dimension of said second series of surfaces is approximately 50% greater than a maximum radial dimension of said first series of surfaces.

10. Cutting tool as defined in claim 7 wherein a difference between a maximum radial dimension of said first series of surfaces and a minimum radial dimension of said second series of surfaces is 20–30% of said maximum radial dimension.

11. Cutting tool as defined in claim 1 wherein the cartridge is provided with a recessed area next to its serrated area, a diameter of said recessed area being somewhat larger than a diameter of an imaginary circle touching outer peaks of the teeth at the end portion of said key element.

\* \* \* \* \*